Aug. 11, 1970  R. H. ARNDT  3,524,133
STATIC STATE VOLTAGE AND CURRENT MONITORING DEVICE
FOR ELECTRIC POWER CABLE TERMINATIONS
Filed Sept. 9, 1966  3 Sheets-Sheet 1

Inventor,
Richard H. Arndt,
by Gilbert P. Tarleton
His Attorney.

Inventor,
Richard H. Arndt,
by *Gilbert P. Tarleton*
His Attorney.

Aug. 11, 1970              R. H. ARNDT              3,524,133
STATIC STATE VOLTAGE AND CURRENT MONITORING DEVICE
FOR ELECTRIC POWER CABLE TERMINATIONS
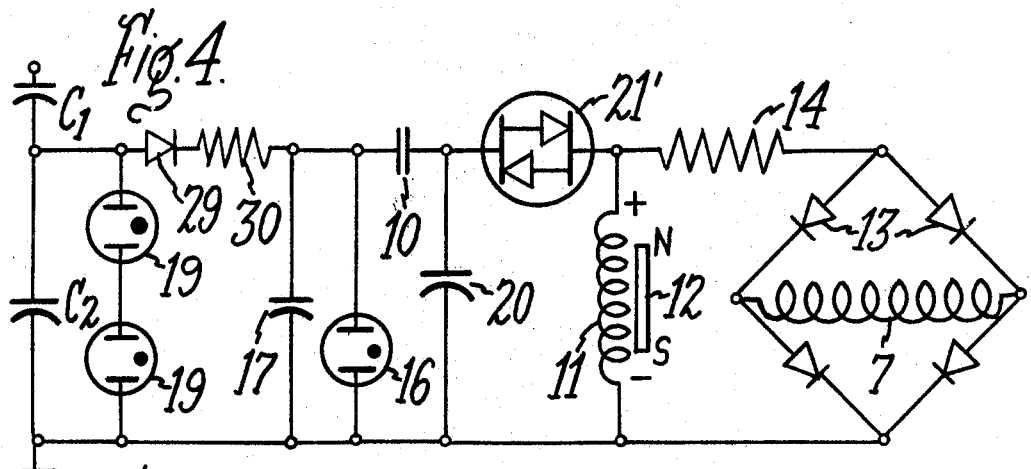
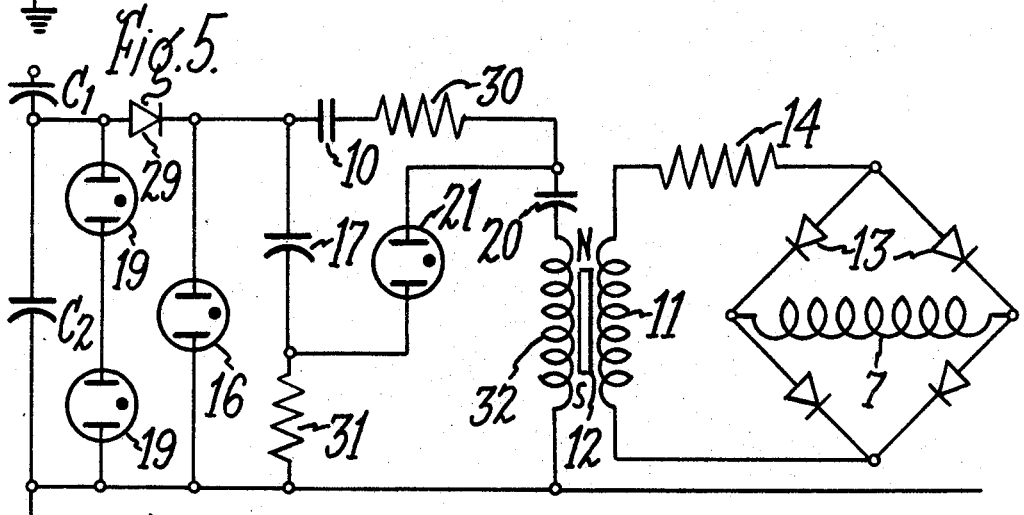
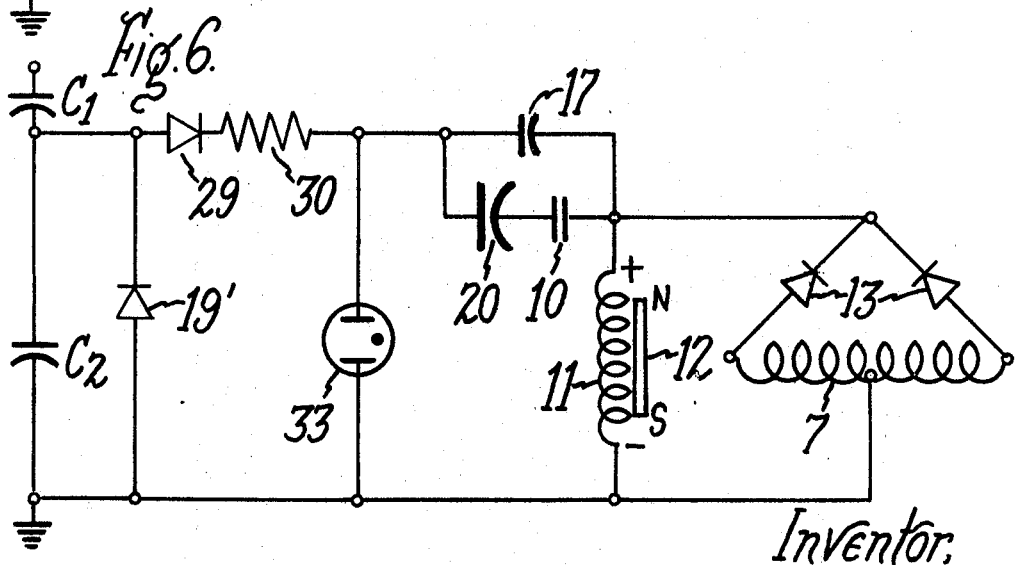
Inventor,
Richard H. Arndt,
by Gilbert P. Tarleton
His Attorney.

United States Patent Office 3,524,133
Patented Aug. 11, 1970

3,524,133
STATIC STATE VOLTAGE AND CURRENT MONI-
TORING DEVICE FOR ELECTRIC POWER CABLE
TERMINATIONS
Richard H. Arndt, Lenox, Mass., assignor to General
Electric Company, a corporation of New York
Filed Sept. 9, 1966, Ser. No. 578,196
Int. Cl. G01r *19/16*
U.S. Cl. 324—102                           10 Claims

ABSTRACT OF THE DISCLOSURE

A static state voltage and current monitoring device is provided for electric power cable terminations. The monitoring device is characterized by having visual indicating means that produce a signal proportional to the level of voltage carried on the termination, in combination with a fault current indicating means that is automatically reset in response to return of normal power conditions to the termination.

---

Figure 1:
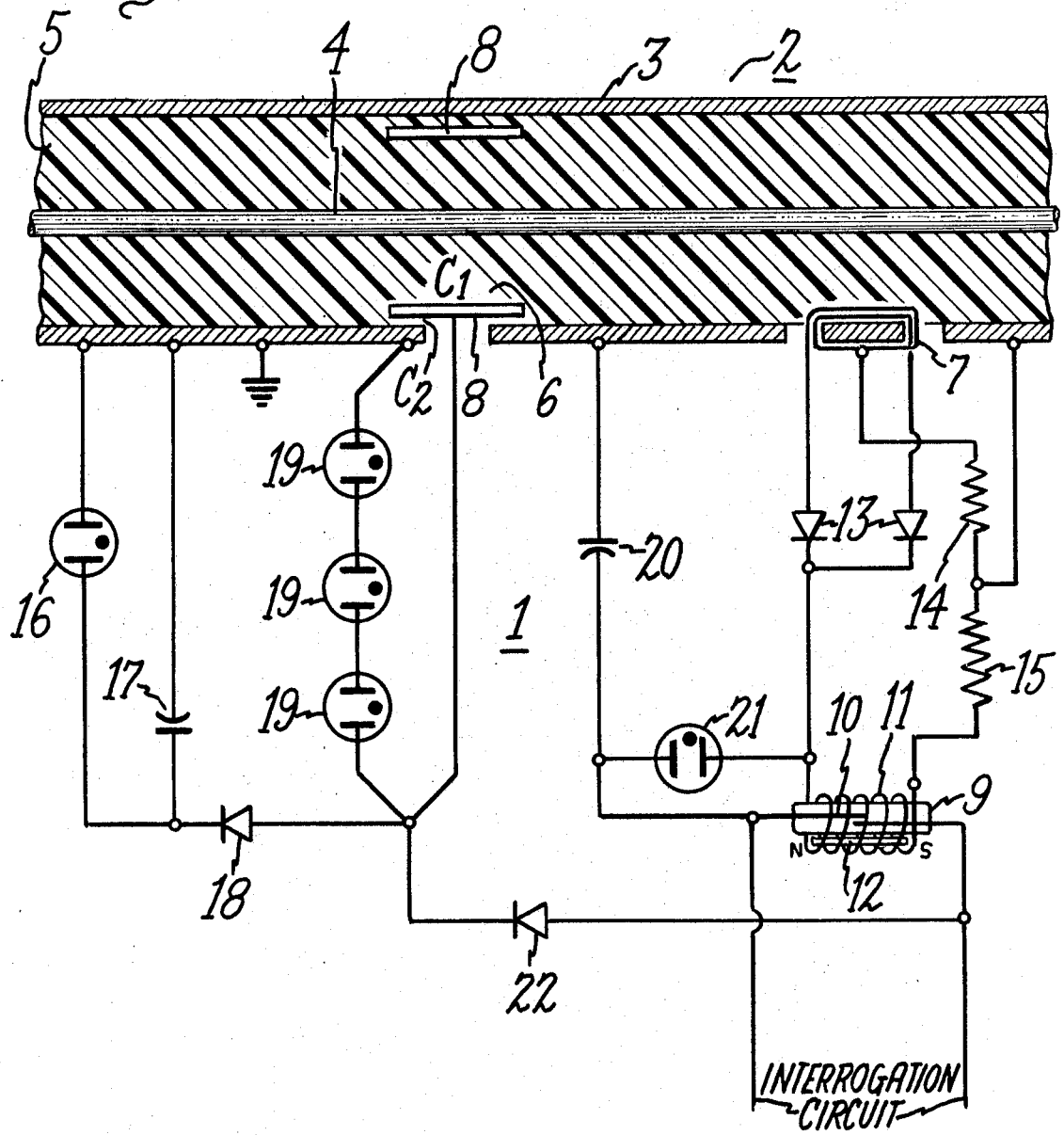

This invention relates to monitoring devices for electric power circuit conductors and more particularly to improvements in automatic indicators for underground distribution systems.

A major problem with underground distribution systems is the locating and repairing of faults in the buried cable. Not only is it difficult to locate the fault but there is a substantial hazard in electrically isolating it, preparatory to repairing it, because with all the high voltage conductors sheathed in solid insulation, it is difficult to determine whether or not they are charged to high potential and hence whether or not they are safe to work on or have their connections changed.

Usually the cable is in sections which interconnect buried junction boxes, switch boxes, transformer vaults or the like, the interiors of all of which are accessible from ground level through removable covers or grills. It has been proposed to locate in such boxes or vaults a voltage indicator and a resettable recording type fault current indicator. As fault currents are quickly interrupted by conventional overcurrent protective equipment for the distribution system, it is desirable that the fault indicator store or record the information that a fault current has passed through its location. Furthermore, it is desirable that the fault indicator automatically reset itself after service returns to normal, as in the case of a transient fault or overcurrent of such short duration as not to trip the protective equipment or after a permanent fault has been isolated and the protective equipment reclosed. However, in accordance with this invention, it is desirable to provide time delayed resetting so as to give time for the protective equipment to operate first in the case of a permanent fault. Otherwise the fault indication might be prematurely canceled or lost. Furthermore, in accordance with another feature of the invention the automatic resetting is voltage responsive rather than current responsive as heretofore proposed.

It has also been proposed to locate such monitoring devices or indicators on the cable terminations. These are electrical connectors, preferably detachable plug and socket type connectors, between the cable and electrical apparatus terminals or bushings. They also serve to control or grade the stress in the insulation in the region where the conductive or semiconductive ground sheath or sleeve, which coaxially surrounds the central cable conductor and its insulation, has been stripped back for making connection to the central cable conductor. As the indicators of the monitoring device must be accessible or readable from the outside and must be of reasonable cost, it is neither safe nor practical to have them at full circuit voltage or carry full fault current. It is, therefore, necessary to utilize low cost but reliable means for stepping down the cable voltage and current but this leads to the further problem, particularly in connection with the built-in voltage reducing means, of obtaining enough power for operating both the voltage indicator and voltage responsive resetting means for the overcurrent indicator.

In accordance with a preferred embodiment of this invention, there is provided a novel monitoring circuit in which the voltage indicator and the fault indicator time delay resetting means are driven by opposite polarity half cycles of the output of a common high impedance voltage reducing means so that the operation of the one does not affect the operation of the other. In accordance with another feature of the invention, the low energy output of the voltage reducing means is relatively slowly stored or accumulated and subsequently relatively quickly released or discharged in a relatively powerful pulse. In the case of the voltage indicator, this produces a relatively strong periodic signal which if the indicator is a lamp, such as a glow discharge lamp, will be a visibly blinking or flashing bright light. In the case of the fault detector resetter, this can provide the desired time delay.

An object of the invention is to provide a new and improved monitoring device for power conductors.

Another object of the invention is to provide a low frequency periodically operated voltage indicator, particularly one whose frequency of operation is a function of voltage.

An additional object of the invention is to provide novel means for automatically resetting a fault indicator.

A further object of the invention is to provide time delay means for resetting a fault indicator.

An added object of the invention is to provide a novel combination of voltage and fault indicators.

A still further object of the invention is to provide novel voltage responsive static time delayed resetting means for resetting a fault indicator.

The invention will be better understood from the following description taken in connection with the accompanying drawings and its scope will be pointed out in the appended claims.

In the drawings,

FIG. 1 is a diagrammatic illustration of the preferred embodiment of the invention.

Figure 2:
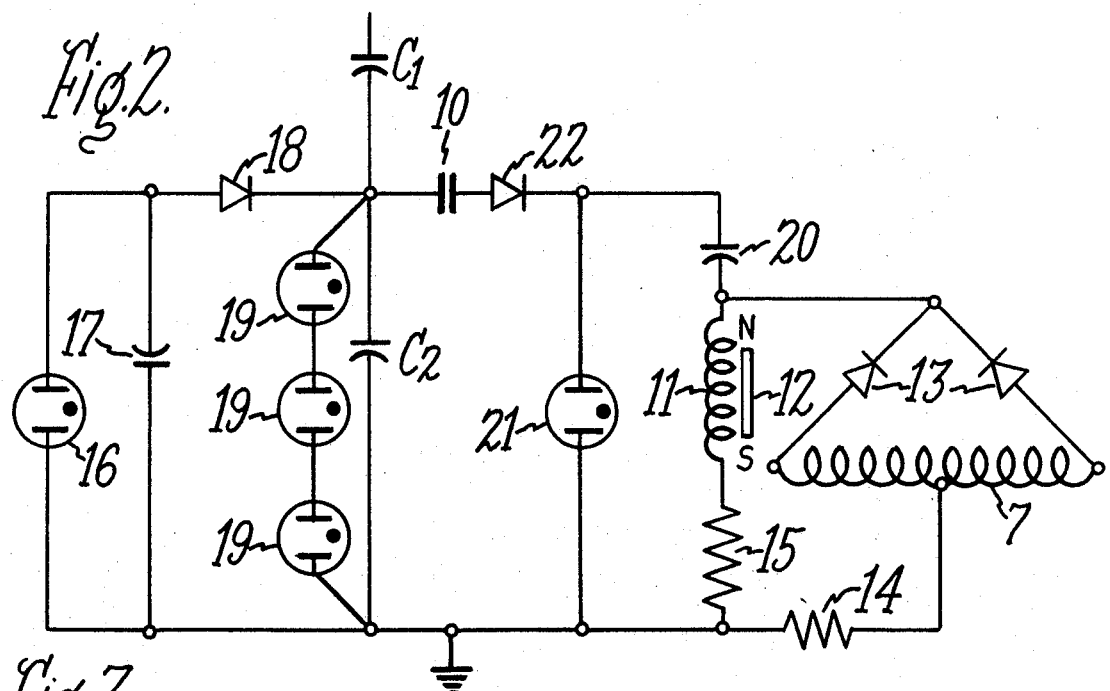
Figure 3:
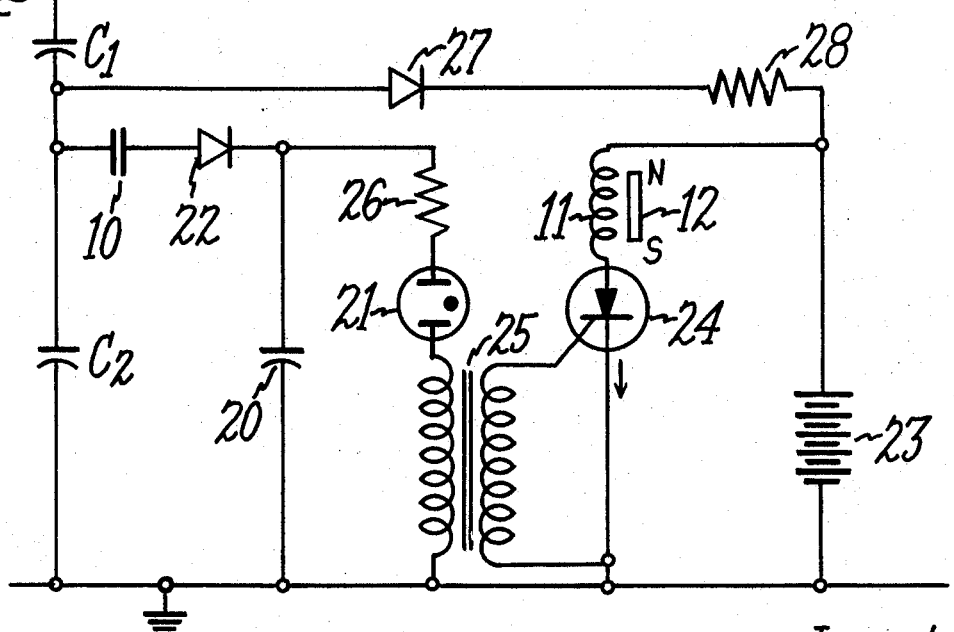

FIG. 2 is a modification in which the circuit relations of certain elements are reversed, FIG. 3 is a modified resetting circuit in which the power is supplied by a storage battery, FIG. 4 is a modification in which both the voltage indicator and the resetting means are supplied through the same rectifier, FIG. 5 is a further modification of which the pulsed voltage indicator circuit is coupled to the resetting circuit for providing triggering pulses for the latter, and FIG. 6 is another modification in which the same discharge device serves as the flashing voltage indicator and the trigger device for the resetting circuit.

Referring now to the drawings and more particularly to FIG. 1, the monitoring circuit is indicated generally at 1 and it is shown, for example, in association with a cable termination, a cross section of a portion of which is shown at 2. This latter comprises an outer metallic and preferably magnetic shell 3 of circular cross section through which coaxially extends a central conductor 4, the intervening space being filled by solid insulation 5 of any suitable material such as elastomeric material. The shell 3 is normally solidly grounded and the central conductor 4 is normally at high potential such as the primary voltage of an underground power distribution system. The monitoring circuit 1 is powered by voltage reducing means 6 and current reducing means 7. The former may conveniently be a capacitance voltage divider consisting essentially of a cylindrical plate or armature 8 coaxial with the shell 3 and conductor 4 and embedded in insulation 5 so that between the conductor 4 and the plate 8 there is a capacitance C1 and between the plate 8 and the shell 2 there is a capacitance C2. As is well known, the total voltage between shell 3 and conductor 4 will be divided between C1 and C2 in inverse relation to their capacitance, and as the capacitance of C2 will be appreciably higher than the capacitance of C1 the voltage of C2 will be small compared to the total voltage. However, such a capacitive voltage divider has a high impedance so that it cannot deliver much power. Such a source is often referred to as a constant current source because of its very poor voltage regulation. However, at no load or at any fixed finite load, the voltage of C2 is a fixed fraction of the total voltage between the conductor 4 and the grounded shell 3.

A reduced or low current output means 7 comprises essentially a current transformer secondary winding wound on a portion of the magnetic shell 3 which portion acts as a magnetic core or flux collector for the coil 7 so that the current in the coil 7 is proportional to the current in the conductor 4.

The fault detector is shown as comprising a magnetic reed switch 9 having normally open contacts 10 in a sealed envelope surrounded by an actuating coil 11 and having associated with it a permanent magnet 12 for latching the contacts 10 closed when they are closed by sufficient energization of the actuating coil 10. The winding 7 has a midtap and it is connected with a biphase rectifier 13 through resistors 14 and 15 to energize the actuating coil 11 in proportion to current in the conductor 4. An interrogation circuit is shown connected across the contacts 10.

The parts 7 through 15 are so proportioned and/or calibrated that the contacts 10 remain open until a fault current of predetermined magnitude flows through the conductor 4 at which the instant the energization of the actuating coil 4 in combination with the latching magnet 12 is sufficient to close the contacts 10 whereupon the latching magnet 12 takes over and holds the contacts 10 closed even if the current in the conductor 4 falls to zero as it normally will as a result of operation or tripping of fault current responsive means (not shown) in the power system supplying the conductor 4.

For indicating the presence of voltage on the conductor 4, there is a signal device of any suitable form such as a glow discharge lamp 16 powered by the voltage of C2.

The device as thus far descriped is not per se novel so far as the present invention is concerned and it constitutes the basic device on which the present invention is an improvement.

One of the improvements provided by the present invention is in the operation of the voltage indicator 16. Because of the high impedance of the capacitive voltage divider, it has been impossible to obtain satisfactory operation of the voltage indicator 16 connected directly across C2. The present invention overcomes this defect by shunting the indicator 16 with a relatively large capacitance capacitor 17 relative to the capacitance of C2 and charging capacitor 17 through a unidirectional conductor or half-wave rectifier 18.

The operation of this part of the device is such that the capacitor 17 is relatively slowly charged during successive positive half cycles until the charge on the capacitor 17 attains the breakdown voltage of the lamp 16 whereupon the capacitor is rapidly discharged through the lamp 16. This provides a relatively brilliant flash of light from the lamp 16 because the comparatively large amount of energy stored in the capacitor 17 is discharged so rapidly. This cycle is then repeated indefinitely at a frequency which is low in comparison with commercial alternating current power distribution frequency so that the voltage indicator is a blinking or flashing light. Furthermore, the rate of charging of the capacitor 17 and hence the rate of blinking of the light 16 is generally proportional to the voltage of the conductor 4 so that the rate of flashing of the lamp 16 is a quantitative measure of the voltage of the conductor 4.

In order to prevent the rectifier 18 from trapping a charge on C2, the latter is shunted by overvoltage protection or discharge means illustrated by way of example as three serially connected glow discharge lamps 19 which as soon as the trapped charge attains an objectionaole level will break down and remove such charge. Were it not for the protective means 19, the trapped charge on C2 would soon build up to the normal back voltage on C2 and the circuit would not operate.

Another function of the protective means 19 is straight overvoltage protection in case of transient overvoltage surges on the conductor 4 which might tend to damage the monitoring circuit.

In a sense, the parts 16, 17 and 18 constitute a relaxation oscillator in which the voltage breakdown device for discharging the capacitor is a voltage signaling glow discharge lamp. Also in a sense, the overvoltage protective means 19 serves as means for clamping the voltage of C2, i.e. the voltage of the plate 8, well below the driving voltage of the capacitance voltage divider.

Typically the capacitance of capacitor 17 may be about 1,000 times the capacitance of capacitor C2.

Another novel feature of the monitoring circuit shown in FIG. 1 is automatic voltage responsive time delay means for resetting the fault indicator 9. This comprises a capacitor 20, a voltage responsive switching device 21 such as a glow discharge lamp, and a unidirectional conductor or half-wave rectifier 22. The capacitor 20 and the rectifier 22 are serially connected through the contacts 10 across the output of the capacitance voltage divider, namely across C2, so that when the contacts 10 are closed the capacitor 20 is relatively slowly charged. It will be observed that the polarities of the rectifiers 18 and 22 are reversed or opposite so that if positive half cycles charge the capacitor 17, negative half cycles charge the capacitor 20 so that in this way the capacitance voltage divider is not overloaded inasmuch as current is not taken from it simultaneously for both the voltage indicator and the resetting means for the fault indicator. The switching device 21 serves to connect the actuating coil 11 across the capacitor 20 through the resistor 15. Therefore after the predetermined time required for the voltage on the capacitor 20 to exceed the breakdown voltage of the device 21, the capacitor 20 is discharged through the actuating coil 11 with reverse polarity so that the discharge current produced flux opposes the flux of the latching magnet 12 and thus allows the contacts 10 to reopen. The resistor 14 serves to inhibit the discharge current of the capacitor 20 from flowing through the coil 7 and the rectifier 13. The resistors 14 and 15 collectively also serve as trimmers for the output of rectifier 13 into the actuating coil 11.

The time delay provided by this resetting circuit prevents resetting of the fault indicator 9 before overcurrent tripping means for the system can operate. In other words, it prevents loss of fault indication as a result of premature resetting or concurrent resetting with the operation of the overcurrent protective means. At the same time, it insures resetting of the indicator in the case of transient or temporary faults which do not cause operation of the overcurrent protective means and in the eventual case where voltage is restored to the conductor 4 after a fault has been isolated and the overcurrent protective means for the system reclosed.

In a sense the time delay resetting means comprising a capacitor 20, the switching device 21, and the half-wave rectifier 22 is in the form of a relaxation oscillator except that it can only go through one cycle of operation and cannot continuously oscillate because on the first cycle the contacts 10 in its driving circuit open and deenergize it.

In the modification shown in FIG. 2 the principal difference is that the relative positions of the capacitor 20 and the triggering device 21 have been reversed so that the capacitor 20 is charged through the actuating coil 11 and the resistor 15, as well as being discharged therethrough when the device 21 breaks down or switches. In order to insure that the discharge current from the capacitor 20 is in the proper reverse direction for causing resetting the directions of conductivity or polarity the rectifiers 18 and 22 have been reversed from what they are in FIG. 1. Of course the entire circuit diagram has in effect been reversed top to bottom so as to speak relative to FIG. 1. Instead of reversing the rectifiers 18–22, the rectifiers 13 could be reversed but in that case it would be necessary to reverse the latching permanent magnet.

The circuit of FIG. 2 operates generally the same as the circuit of FIG. 1, the voltage indicator part of the circuit being the same and the only difference in the automatic time delay resetting circuit being that the capacitor 20 is charged through the actuating coil 11 and the resistor 15.

In the modification shown in FIG. 3, the power for providing the resetting pulse of current through the actuating coil 11 of the fault indicator is provided by a battery 23, such as a sealed nickel cadmium battery, and the discharge of the battery 23 through the coil 11 in the proper direction is obtained by means of a controlled switching device such as a silicon controlled rectifier 24 whose gate is pulsed by a pulse transformer 25 connected in series with the voltage responsive triggering device 21. The battery 23 can be trickle charged through a rectifier 27 and a resistor 28 during normal circuit conditions.

It is not essential that both the voltage indicator circuit and the resetting circuit be energized through different diodes and FIG. 4 shows a circuit in which both the flashing voltage indicator and the fault detector resetting means are energized through a common diode 29, optionally also through a common resistor 30. In this circuit, the overvoltage protective devices 19 break down and prevent trapping of a blocking charge on the capacitor C2 during the alternate half cycles when the diode 29 is blocking. Of course in this circuit there will be no flashing of the voltage indicator lamp 16 until the fault indicator is reset because with the contacts 10 closed the energy storage capacitor 20 of the resetting part of the circuit will be the predominant one and will charge slower than the energy storage capacitor 17 for the flashing voltage indicator. In this figure, a different triggering device 21' in the form of a diac is shown.

In the modification shown in FIG. 5, a resistor 31 is connected in circuit with the capacitor 17 so that when this is periodically discharged by the voltage indicator signal lamp 16 it will produce voltage pulses as voltage drops in the resistor 31 which are applied to the switching device 21 to insure its breakdown and the discharge of the resetting energy storage capacitor 20 through a separate resetting coil 32 for the fault detector. By making the resetting coil 32 separate from the actuating coil 11 of the reed switch better matching of the characteristics of the tripping and reset circuits to their respective driving means can be obtained.

In the modification shown in FIG. 6, the same glow discharge lamp 33 operates as both a flashing voltage indicator and the reset switch. This is accomplished by the use of a low capacitance capacitor 17 permanently in the circuit in which case the voltage indicating flashing current of the lamp 33 goes through the operating coil 11, but the magnitude of this current is not sufficient to cause actuation of the reed switch. However, when the reed switch contacts 10 close the much larger capacitor 20, typically ten times as large as 17, then charges slowly and while charging stops the flashing of the lamp 33. However, when the breakdown voltage of the lamp 33 is obtained the relatively heavy discharge current of the capacitor 20 through the coil 11 will cause automatic reset. This figure also shows the use of a diode 19' as the clamp for the voltage of capacitor C2.

In all of the figures the capacitive voltage divider comprising the capacitances C1 and C2 is ordinarily a very high impedance device so that for loads in the ordinary impedance range the load current is essentially constant. Typically capacitance C1 has a capacitance of ten picofarads, and capacitance C2 has a capacitance of one hundred picofarads.

In FIGS. 1 through 5 the triggering device 21 does not have to be in the form of a glow discharge device and it can be any equivalent device such as a triggered semiconductor diode, a Shockley diode, a silicon unidirectional switch, or a diac.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A monitoring device for a high voltage, high current electric power distribution conductor comprising a resettable fault indicator inductively coupled to said conductor and responsive to passage of fault current through said conductor for producing an indication of such occurrence and for retaining the indication after said conductor is de-energized, and time delayed acting means capacitively coupled to said conductor and electrically connected to said fault indicator, said time delayed acting means being invariably responsive to a subsequent normal current condition of said conductor for automatically resetting said fault indicator.

2. A monitoring circuit for a main high voltage high current electric power distribution conductor comprising, means for producing a low current proportional to the current in said conductor, a resettable fault current indicator actuatable by said low current producing means to a latched condition for retaining an indication of the passage of fault current through said main conductor, means for producing an output voltage proportional to but substantially less than the voltage of said main conductor, and means in the form of a relaxation oscillator comprising a half-wave rectifier (22) and a capacitor (20) electrically connected in series with said means for producing an output voltage when said fault indicator is latched in its actuated condition to apply a charging voltage to the capacitor when the rectifier conducts current, and a switching device (21) electrically connected in series with said capacitor and said resettable fault current indicator, said switching device being operable to discharge the capacitor through the resettable fault current indicator thereby causing said indicator to move to an unlatched condition whereby a time delayed resetting of said fault indicator is afforded.

3. A monitoring circuit for a high voltage high alternating current carrying conductor comprising, in combination, a capacitance voltage divider for connection between said conductor and ground and having a low voltage tap, a current transforming secondary winding inductively coupled to said conductor and having low current output terminals, a magnetic reed switch having an actuating coil connected to said output terminals through a rectifier, said reed switch having a pair of normally open contacts which are closed by a predetermined energization of said actuating coil and a permanent magnet for latching said contacts closed, a capacitor and a rectifier serially connected with said contacts between said tap and ground, and a glow discharge device connected to said capacitor and actuating coil to discharge said capacitor through said coil with reverse polarity to provide automatic time delayed resetting of said switch.

4. A monitoring circuit for a main high voltage high current electric power distribution conductor comprising, in combination, voltage dividing means for deriving by electrostatic induction a low output voltage proportional to the voltage of said main conductor, a relaxation oscillator connected to be driven by said output voltage, the breakdown device of said oscillator being a glow discharge lamp which constitutes a visually blinking indicator of the presence of voltage on said conductor and whose frequency of blinking is a measure of the magnitude of that voltage, current transforming means for deriving by electromagnetic induction a low output current proportional to the current in said main conductor, a resettable fault current indicator actuatable by said output current to a latched condition for retaining an indication of the passage of fault current through said main conductor, and means in the form of a second relaxation oscillator energized by said output voltage when said fault indicator is latched in its actuated condition to provide time delayed resetting of said fault indicator.

5. A monitoring circuit as in claim 4 in which said output voltage is alternating and said relaxation oscillators are energized by said output voltage through oppositely poled unidirectional conductors so that one oscillator is driven by positive half cycles and the other by negative half cycles.

6. A monitoring circuit as in claim 5 with overvoltage protective breakdown means shunting the output of said voltage dividing means.

7. A monitoring circuit as in claim 4 in which said relaxation oscillators are coupled so that the first relaxation oscillator provides triggering voltage pulses for the second.

8. A monitoring circuit as in claim 4 in which said glow discharge lamp also comprises the triggering device of the second oscillator.

9. In a termination for coaxial high voltage underground power cable, a grounded outer metal shell of circular cross section, an inner axially extending high voltage alternating current carrying conductor, solid insulation between said conductor and shell, a conductive plate embedded in said insulation between said inner conductor and outer shell forming therewith a capacitive voltage divider, an insulated conductive lead from said plate extending through said shell and constituting a reduced voltage output tap of said voltage divider, a capacitor and a unidirectional conductor serially connected between said lead and said shell, a voltage limiting device connected between said lead and said shell, and a voltage indicator glow discharge lamp connected across said capacitor, said capacitor having many times the capacitance between said plate and shell, said lamp having a breakdown voltage less than the voltage to which said capacitor is charged through said unidirectional conductor whereby said lamp is flashed at a frequency much lower than the frequency of said alternating current and which flashing frequency is roughly proportional to the voltage of said central conductor so as to provide a quantitative signal of the presence of voltage on said central conductor.

10. In a termination for coaxial high voltage underground power cable, a grounded outer magnetic metal shell of circular cross section, an inner axially extending high voltage alternating current carrying conductor, solid insulation between said conductor and shell, a capacitive voltage divider embedded in said insulation and having a reduced voltage insulated output tap extending therefrom, a current transformer secondary winding wound on a portion of said shell as a magnetic core for said winding, a magnetic reed switch having normally open contacts, an actuating coil for closing said coil, a permanent magnet adjacent said switch for holding said contacts closed after they have been closed by said actuating coil, a rectifier for connecting said actuating coil to said secondary winding, and an automatic time delayed resetting circuit for said switch comprising the contacts of said switch, a half-wave rectifier and a capacitor serially connected between said tap and shell with a glow discharge lamp serially connected with said actuating coil across said capacitor, said glow discharge lamp acting as a voltage responsive switch for discharging said capacitor through said actuating coil to reset said switch, and voltage limiting means connected betwen said tap and shell.

References Cited

UNITED STATES PATENTS

| | | | |
|---|---|---|---|
| 1,762,811 | 6/1930 | Charlton | 317—142 |
| 2,013,241 | 9/1935 | Hefner | 340—253 |
| 2,050,852 | 8/1936 | Moore | 340—253 |
| 2,808,566 | 10/1957 | Douma | 324—127 |
| 3,022,498 | 2/1962 | Alcott | 340—253 |
| 3,067,411 | 12/1962 | Dhimos | 340——253 XR |
| 3,177,480 | 4/1965 | Sankey | 340—253 |
| 3,253,215 | 5/1966 | Moakler et al. | 324—127 XR |
| 3,271,673 | 9/1966 | Woroble | 324—122 XR |
| 3,287,636 | 11/1966 | Gagniere | 324—54 |
| 2,244,713 | 6/1941 | Ledbetter | 340—248 XR |
| 2,709,800 | 5/1955 | Temple et al. | 324—127 XR |
| 2,992,367 | 7/1961 | Sinn | 317—142 XR |
| 3,309,571 | 3/1967 | Gilker | 317—23 XR |
| 3,356,939 | 12/1967 | Stevenson | 324—127 XR |
| 2,812,491 | 11/1957 | Figlio et al. | 324—54 |
| 3,159,767 | 12/1964 | Secunde et al. | 317—31 |
| 3,329,870 | 7/1967 | Viney et al. | 317—36 |

FOREIGN PATENTS

| | | |
|---|---|---|
| 591,073 | 8/1947 | Great Britain. |
| 188,625 | 4/1964 | Sweden. |

OTHER REFERENCES

Conley et al.: Magnetic Object Sensor, IBM Technical Disclosure Bulletin, vol. 5, No. 8, January 1963, pp. 44, 45.

GERARD R. STRECKER, Primary Examiner

U.S. Cl. X.R.

317—22, 31, 50, 151; 324—51, 126, 133, 253